US012611968B2

(12) United States Patent
Rangel Sanchez et al.

(10) Patent No.: US 12,611,968 B2
(45) Date of Patent: Apr. 28, 2026

(54) VEHICLE HAVING ERGONOMICALLY ADJUSTABLE SEAT ASSEMBLY

(71) Applicant: Ford Global Technologies, LLC, Dearborn, MI (US)

(72) Inventors: Josue Rodrigo Rangel Sanchez, Queretaro (MX); Alexis Alcantara, Atizapan de Zaragoza (MX); Armando Ayala Huaracha, Naucalpan de Juarez (MX); Paula Rocio Moreno Roa, Tenango del Valle (MX); Jesus Munoz, State of Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 17/957,589

(22) Filed: Sep. 30, 2022

(65) Prior Publication Data

US 2024/0109460 A1 Apr. 4, 2024

(51) Int. Cl.
*B60N 2/02* (2006.01)

(52) U.S. Cl.
CPC .......... *B60N 2/0277* (2023.08); *B60N 2/0268* (2023.08); *B60N 2/0272* (2023.08)

(58) Field of Classification Search
CPC .. B60N 2/0244; B60N 2/0268; B60N 2/0272; B60N 2/0277; B60N 2210/24; B60N 2/02; B60N 2/002; B60R 16/037; G06V 20/597; G06V 40/10
See application file for complete search history.

(56) References Cited

U.S. PATENT DOCUMENTS

| | | | | |
|---|---|---|---|---|
| 10,293,782 B1 * | 5/2019 | Schaub | .................... | B60Q 9/00 |
| 11,155,184 B1 * | 10/2021 | Wang | .................... | B60N 2/0273 |
| 2008/0189053 A1 * | 8/2008 | Breed | .................... | G01S 7/417 |
| | | | | 702/41 |

(Continued)

FOREIGN PATENT DOCUMENTS

| | | | |
|---|---|---|---|
| CN | 110843614 A | | 2/2020 |
| CN | 109774779 B | * | 8/2020 |

(Continued)

OTHER PUBLICATIONS

WO2004103779A1 English Translation (Year: 2004).*

(Continued)

*Primary Examiner* — Kito R Robinson
*Assistant Examiner* — Alexander V Gentile
(74) *Attorney, Agent, or Firm* — Vichit Chea; Price Heneveld LLP

(57) ABSTRACT

A vehicle includes a body defining a cabin interior, a seat assembly having a seat base, a seat back and a plurality of actuators configured to adjust ergonomic positions of the seat assembly. The vehicle has a first imaging system located in the cabin interior and configured to capture first images of an upper body of an occupant seated on the seat assembly, and a second imaging system configured to capture second images of a lower body of the occupant seated on the seat assembly. A controller processes the first and second images to determine dimension data and position data of the occupant and determines an adjusted ergonomic configuration of the seating assembly, and controls the actuators to adjust the seat assembly to the adjusted ergonomic configuration.

16 Claims, 10 Drawing Sheets

(56)          References Cited

U.S. PATENT DOCUMENTS

| | | |
|---|---|---|
| 2018/0297488 A1 | 10/2018 | Lem et al. |
| 2021/0206386 A1 | 7/2021 | Ponthieu et al. |
| 2021/0237620 A1* | 8/2021 | Mizoi ................. G01B 11/026 |
| 2021/0276501 A1 | 9/2021 | Li et al. |
| 2021/0295069 A1* | 9/2021 | Toth ....................... H04N 23/56 |
| 2023/0347906 A1* | 11/2023 | Moidunny ........... B60N 2/0272 |
| 2025/0121786 A1* | 4/2025 | Gempel ................ B60R 16/037 |

FOREIGN PATENT DOCUMENTS

| | | | | |
|---|---|---|---|---|
| CN | 111881886 A | * | 11/2020 | ............. G06N 3/045 |
| WO | WO-2004103779 A1 | * | 12/2004 | ........... B60N 2/0224 |

OTHER PUBLICATIONS

CN109774779 English Translation of the Description (Year: 2020).*
CN111881886A English Translation of the Description (Year: 2020).*

* cited by examiner

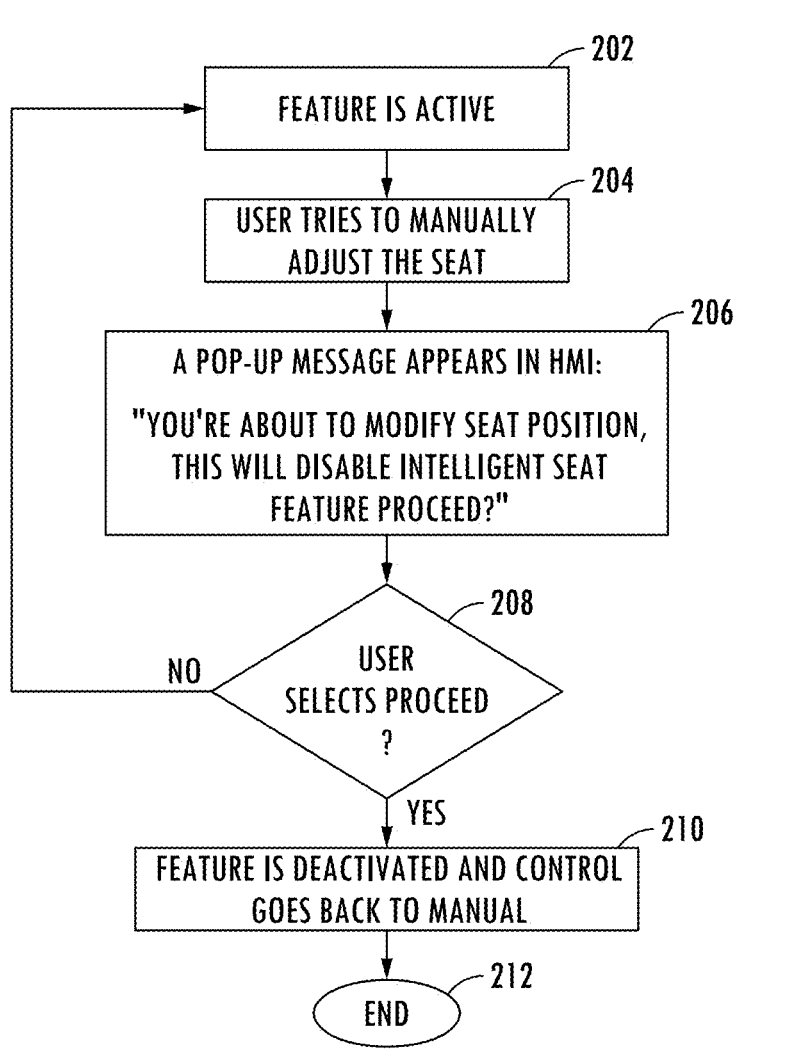

```
                          ┌──────────────────────┐ ⌐202
                          │   FEATURE IS ACTIVE   │
                          └──────────────────────┘
                                     │
                                     ▼          ⌐204
                          ┌──────────────────────┐
                          │ USER TRIES TO MANUALLY│
                          │    ADJUST THE SEAT    │
                          └──────────────────────┘
                                     │
                                     ▼                    ⌐206
                 ┌──────────────────────────────────────┐
                 │     A POP-UP MESSAGE APPEARS IN HMI:  │
                 │                                       │
                 │ "YOU'RE ABOUT TO MODIFY SEAT POSITION,│
                 │ THIS WILL DISABLE INTELLIGENT SEAT    │
                 │        FEATURE PROCEED?"              │
                 └──────────────────────────────────────┘
                                     │
                                     ▼        ⌐208
                              ◇ USER ◇
                 NO    ◇ SELECTS PROCEED ◇
                       ◇        ?        ◇
                                     │ YES
                                     ▼                ⌐210
                 ┌──────────────────────────────────────┐
                 │ FEATURE IS DEACTIVATED AND CONTROL    │
                 │        GOES BACK TO MANUAL            │
                 └──────────────────────────────────────┘
                                     │
                                     ▼      ⌐212
                               (  END  )
```

MEASURING PROCESS ABOUT
STEERING WHEEL

404

DATA PROCESSING ABOUT
STEERING WHEEL

406

CENTER OF STEERING WHEEL HORIZONTAL
POSITION = 30cm + CHEST HORIZONTAL POSITION

408

TARGET TOP OF STEERING WHEEL VERTICAL
POSITION = SHOULDERS HEIGHT - 5cm

410

SEND CALCULATED PARAMETERS TO ELECTRIC
POWER STEERING MODULE CONTROLLER

VEHICLE HAVING ERGONOMICALLY ADJUSTABLE SEAT ASSEMBLY

FIELD OF THE DISCLOSURE

The present disclosure generally relates to vehicle seating, and more particularly relates to a vehicle having a seat assembly with ergonomic controls for adjusting the seat assembly.

BACKGROUND OF THE DISCLOSURE

Motor vehicles are commonly equipped with power actuatable and adjustable seat assemblies. The actuators are typically controlled in response to a user input to adjust various movements of the seat assembly. It would be desirable to provide for an adjustable seating assembly that provides for enhanced ergonomic control.

SUMMARY OF THE DISCLOSURE

According to a first aspect of the present disclosure, a vehicle is provided including a body defining a cabin interior, a seat assembly having a seat base, a seat back and a plurality of actuators configured to adjust ergonomic positions of the seat assembly, a first imaging system located in the cabin interior and configured to capture first images of an upper body of an occupant seated on the seat assembly, and a second imaging system configured to capture second images of a lower body of the occupant seated on the seat assembly. The vehicle also includes a controller processing the first and second images to determine dimension data and position data of the occupant and determining an adjusted ergonomic configuration of the seating assembly, the controller further controlling at least one of the plurality of actuators to adjust the seat assembly to the adjusted ergonomic configuration.

Embodiments of the first aspect of the present disclosure can include any one or a combination of the following features:

the first imaging system comprises a first upper camera oriented to capture a front view of the upper body and a second upper camera oriented to capture a side view of the upper body;

the second upper camera is located proximate to a roof of the vehicle and the first upper camera is located forward of the seat assembly;

the second imaging system comprises a first lower camera oriented to capture a front view of the lower body and a second lower camera oriented to capture a side view of the lower body;

the first lower camera is located within one of a steering wheel and a dashboard of the vehicle;

the first imaging system captures the first images to include an upper torso and head of the occupant and the second imaging system captures the second images to include legs of the occupant;

the determined dimension data and position data includes length dimensions of portions of the body of the occupant and angles between interconnected body parts;

the angles include a back angle and a bent leg angle;

the plurality of actuators control one or more of a longitudinal position of the seat assembly, a height of the seat assembly, a recline angle of the seat back relative to the seat base, and a lumbar support;

the angles include a first angle between a an upper leg and a lower leg of the occupant, a second angle between the abs and lower legs of the occupant, and a third angle between the seat lumbar support and torso of the occupant;

the dimension data further include a distance between a vehicle floor and legs of the occupant; and the vehicle further comprises a plurality of distance sensors.

According to a second aspect of the present disclosure, a vehicle is provided including a body defining a cabin interior, a seat assembly having a seat base, a seat back and a plurality of actuators configured to adjust ergonomic positions of the seat assembly, and a first imaging system located in the cabin interior and configured to capture first images of an upper body of an occupant seated on the seat assembly, wherein the first imaging system comprises a first upper camera oriented to capture a front view of the upper body and a second upper camera oriented to capture a side view of the upper body. The vehicle also includes a second imaging system configured to capture second images of a lower body of the occupant seated on the seat assembly, wherein the second imaging system comprises a first lower camera oriented to capture a front view of the lower body and a second lower camera oriented to capture a side view of the lower body and a controller processing the first and second images to determine dimension data and position data of the occupant and determining an adjusted ergonomic configuration of the seating assembly, the controller further controlling the plurality of actuators to adjust the seat assembly to the adjusted ergonomic configuration.

Embodiments of the second aspect of the present disclosure can include any one or a combination of the following features:

the first imaging system captures the first images to include an upper torso and head of the occupant and the second imaging system captures the second images to include legs of the occupant;

the first imaging system is located proximate to a roof of the vehicle and the second imaging system is located forward of the seat assembly;

the first lower camera is located within one of a steering wheel and a dashboard of the vehicle;

the determined dimension data and position data includes length dimensions of portions of the body of the occupant and angles of between interconnected body parts;

the plurality of actuators control one or more of a longitudinal position of the seat assembly, a height of the seat assembly, a recline angle of the seat back relative to the seat base, and a lumbar support;

the angles include a first angle between an upper leg and lower leg of an occupant, a second angle between the abs and upper legs of an occupant, and a third angle between the seat lumbar support and torso of the occupant; and the vehicle further comprises a plurality of distance sensors.

These and other features, advantages, and objects of the present disclosure will be further understood and appreciated by those skilled in the art by reference to the following specification, claims, and appended drawings.

BRIEF DESCRIPTION OF THE DRAWINGS

In the Drawings:

FIG. 5 is a flowchart illustrating a method for activating the adjustable seat assembly, according to one example;

DETAILED DESCRIPTION OF PREFERRED EMBODIMENTS

Figure 1:
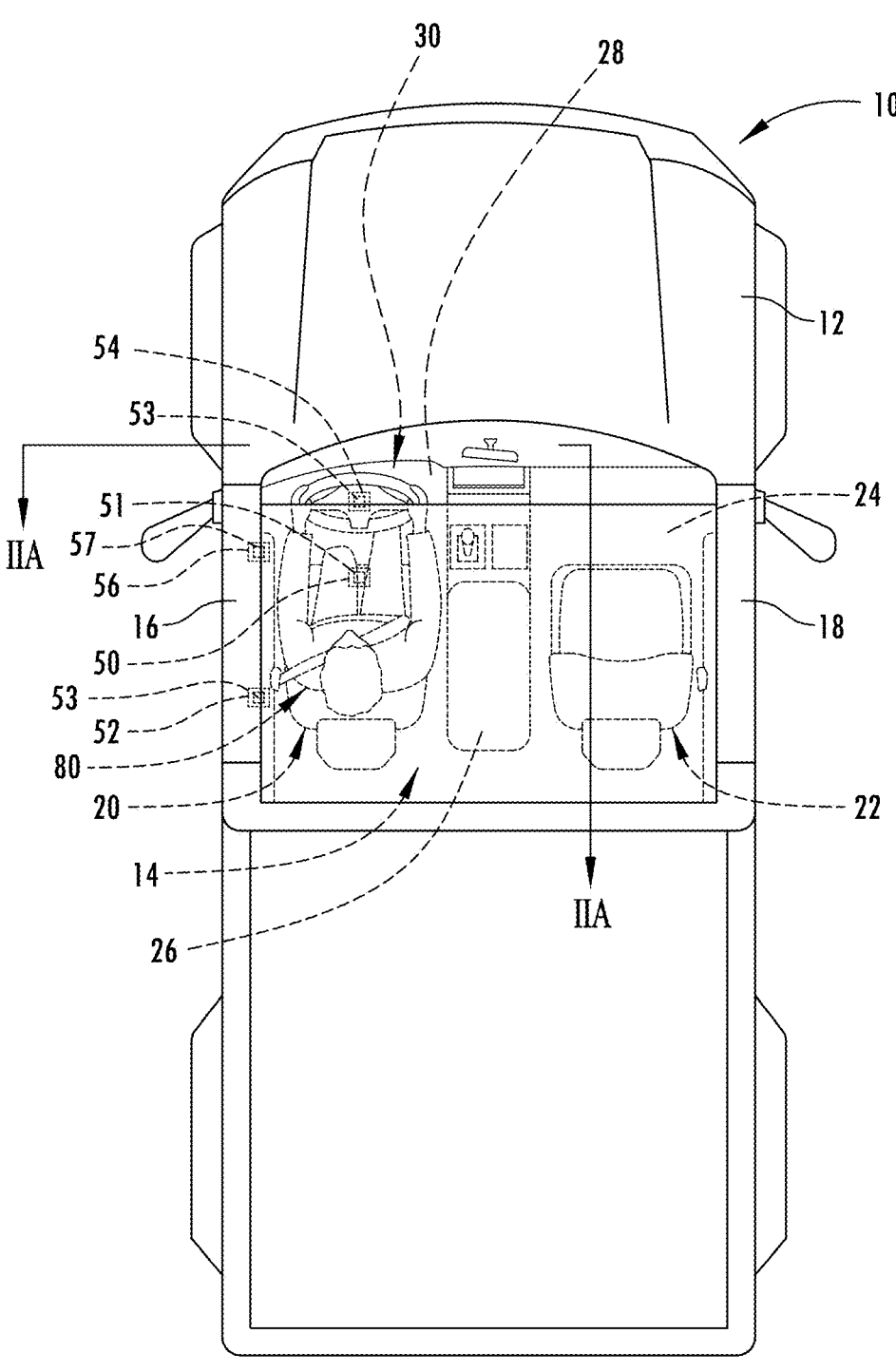
FIG. 1 is a top view of a motor vehicle having at least one ergonomically adjustable seat assembly, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having an adjustable seat assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with driver and passenger seating assemblies for transporting one or more seated occupants including a driver and passenger in the example shown. The motor vehicle 10 has a vehicle body 12 that generally defines a cabin interior 14. The cabin interior 14 may contain various features and trim components within the vehicle body 12. The cabin interior 14 is shown having an arrangement of seat assemblies including a front row of seating having a driver seat assembly 20 and a passenger seat assembly 22. The seating arrangement may include additional rows of seating, according to other examples. It should be appreciated that the vehicle 10 may be a motor vehicle, such as a wheeled car, truck, SUV, van or bus, for example, or an airplane, train, boat or other vehicle capable of transporting one or more passengers.

The cabin interior 14 shown in FIG. 1 has the driver seat assembly 20 and passenger seat assembly 22 both supported on and connected to the vehicle floor 24. The driver seat assembly 20 is located proximate to a first front side door 16 and the passenger seat assembly 22 is located proximate to a second front side door 18. As such, a driver and passenger may enter one of the side doors 16 or 18 to access the driver or passenger seat assemblies 20 or 22, respectively. In addition, the driver seat assembly 20 is spaced from the passenger seat assembly 22 by a center console 26 that is disposed therebetween.

The vehicle 10 further includes a dashboard 28, which may also be referred to as an instrument panels, located generally forward of the driver and passenger seat assemblies 20 and 22. Forward of the driver seat assembly 20 and extending vehicle-rearward from the dashboard 28 is a steering wheel assembly 30 which includes a steering wheel 32 operatively coupled to a steering column 34 that extends from the dashboard 28. The steering wheel assembly 30 may be adjustable in position to move axially along the steering column 34 and to rotate to different elevations and angles to provide an adjustable steering wheel position.

Figure 2A:
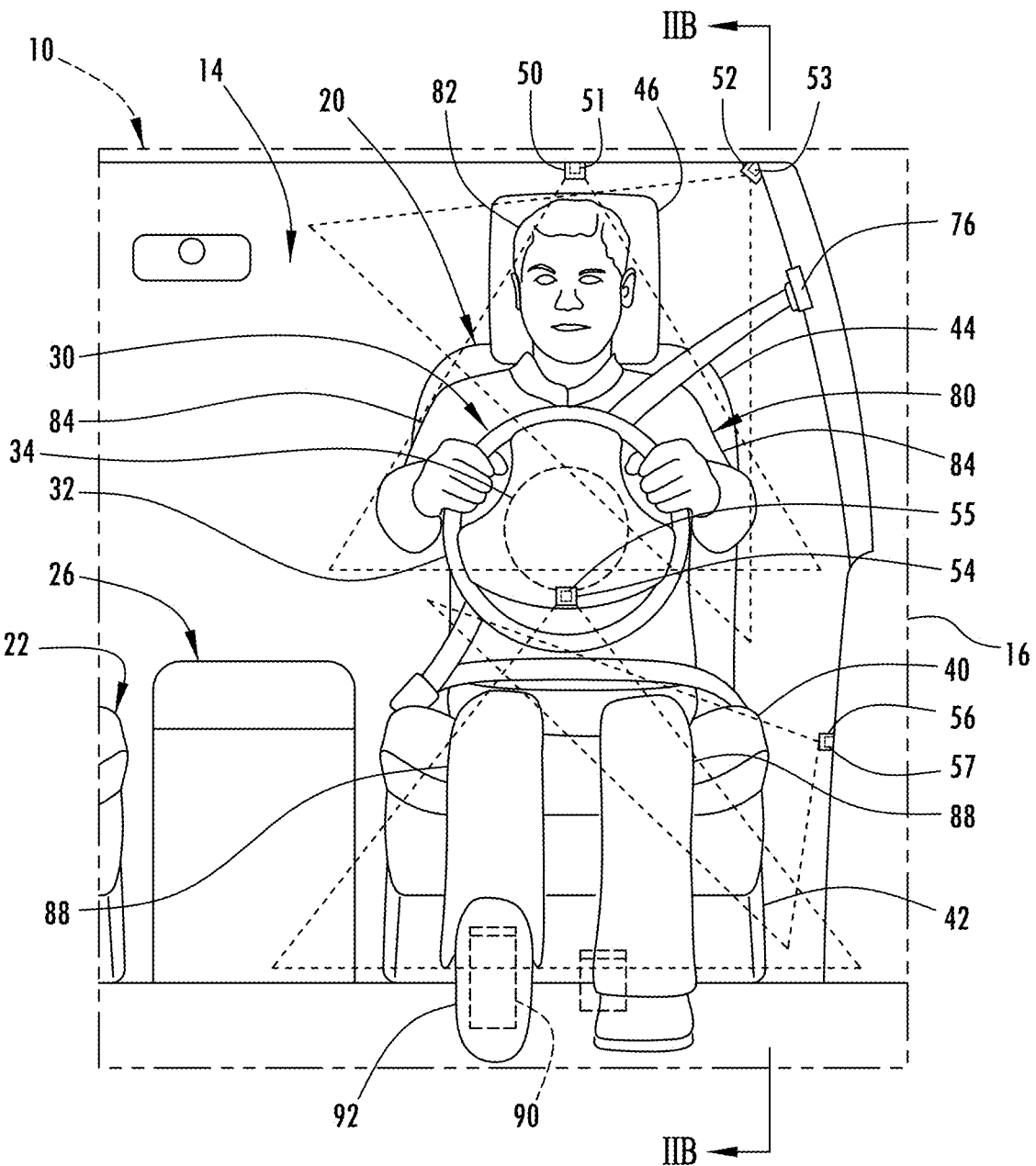
FIG. 2A is a front view of the adjustable seat assembly and first and second imaging systems, according to one example.

In FIGS. 1-2A, a seated occupant 80, such as a driver of the vehicle 10, is shown seated in the adjustable seat assembly 20. The adjustable seat assembly 20 includes a seat 40 supported on a base 42 which, in turn, is supported on the vehicle floor 24. The adjustable seat assembly 20 further includes a seatback 44 which may articulate relative to the seat 40 to adjust an angle of articulation therebetween. In addition, the seating assembly 20 includes a headrest 46 coupled to the upper end of the seatback 44 which may extend or retract in height and articulate to an angular position to adjust the position of the headrest 46. The seat assembly 20 may include seat input controls 48 such as toggle switches which may be manually activated to activate actuators to move the components of the seat assembly 20 into various seating configurations.

The vehicle 10 is further configured with a sensing arrangement that may sense parameters of an occupant seated in the seat assembly 20 and may adjust the ergonomic configuration of the seat assembly 20 by controlling one or more actuators. The sensor arrangement includes a first camera system including a first upper camera 50 and a second upper camera 52 both located in the cabin interior 14 and configured to capture first images of an upper portion of the seated occupant 80. The sensor arrangement further includes a second camera system including a first lower camera 54 and a second lower camera 56 both located in the cabin interior 14 and configured to capture images of a lower portion of the seated occupant 80. The first upper camera 50 is shown located on the underside of the ceiling at the upper side of the cabin interior 14 and oriented at a position forward of the seat assembly 20 to capture images of the upper portion of the occupant 80 from the front side thereof. The second upper camera 52 is located on the upper lateral side of the seat assembly 20, such as in the door 16, according to one example, and oriented to capture side view images of the upper portion of the occupant 80. It should be appreciated that the second upper camera 52 may be located on an opposite side of the seated occupant, such as in a ceiling on the opposite side of the occupant. As such, the first and second upper cameras 50 and 52 may capture front and side images of the seated occupant 80 which are processed to determine dimensional date of the users including length dimensions of body components and angles of movement of body components. The upper lateral portion may include the head, shoulders, arms and mid-torso of the seated occupant 80.

The second camera system includes the first lower camera 54 shown located proximate to the steering wheel assembly 30 and oriented vehicle rearward to capture the front side of the lower portion of the body of the seated occupant 80. The second lower camera 56 is shown located laterally to the side of the seated occupant 80, such as in the inner door 16, according to one example. It should be appreciated that the second lower camera 56 may be located on an opposite side of the seated occupant 80 such as on a side of the center console 26, according to another example. As such, the second imaging system captures images of the lower body portion of the seated occupant 80 from both a front and side view so as to determine dimensions of the lower body including length dimensions and articulation angles. The lower body portion may include the feet, legs and hip portions of the seated occupant 80.

Figure 2B:
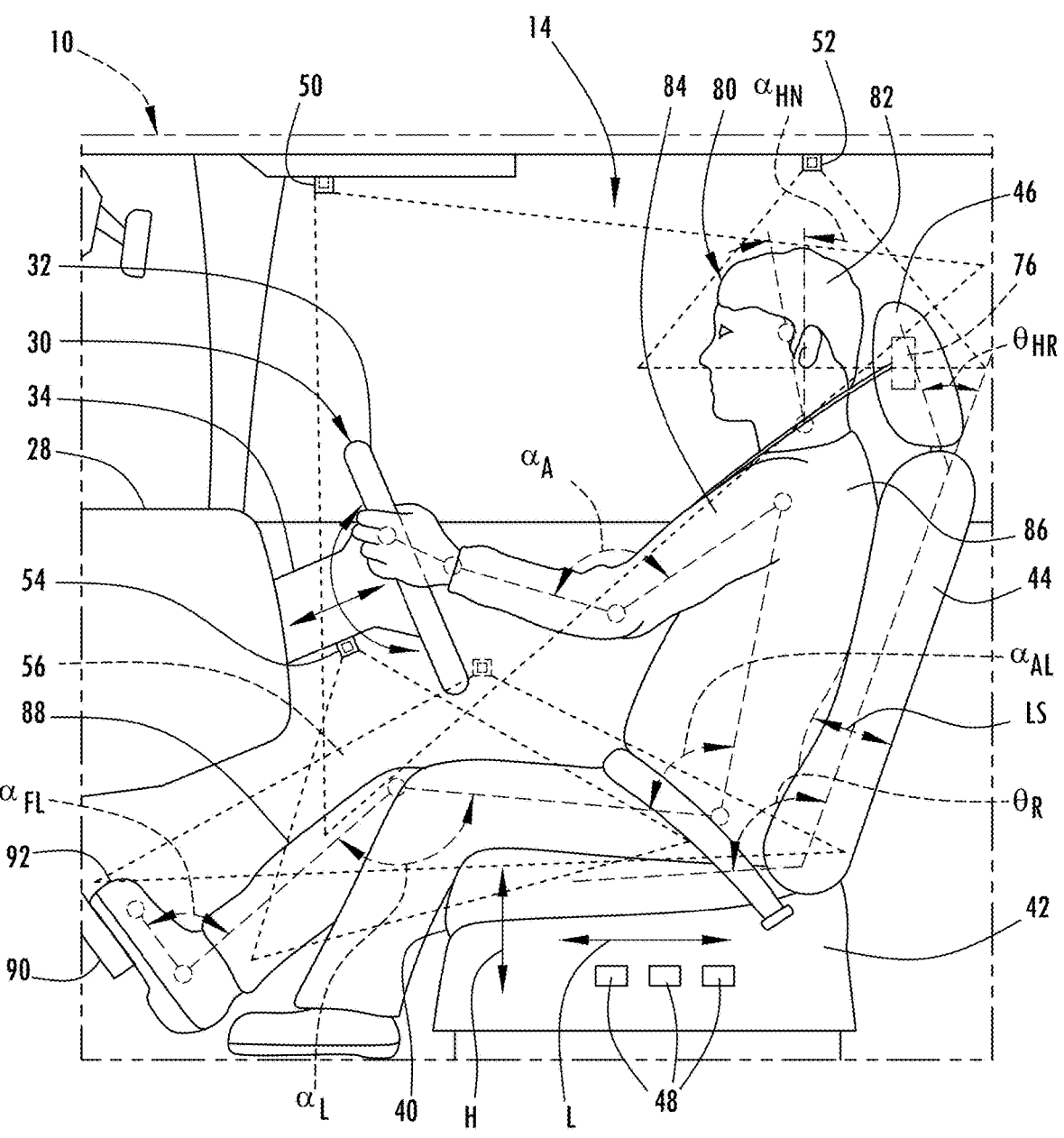
FIG. 2B is a side view of the adjustable seat assembly further illustrating the first and second imaging systems, according to one example.

The seated occupant 80 is shown in FIG. 2B having various body parts including a head 82, torso 86 with shoulders, two arms 84, two legs 88 and two feet 92 arranged in a particular ergonomic configuration on the seat assembly 20. The dimensions of the various body parts of the seated occupant and the angles of the body parts in various configurations may be sensed with the use of the first and second imaging systems in addition to the use of sensed distances acquired with distance sensors 51, 53, 55 and 57, such as time-of-flight sensors which may be integrated into the first, second, third and fourth imaging cameras 50, 52, 54, and 56, respectively, as shown in FIG. 2A. The distance sensors 51, 53, 55 and 57 may be separate from the cameras in other embodiments. With the seated occupant 80 seated in a particular seat assembly configuration, the body of the occupant will have a certain ergonomic position. The vehicle 10 may sense the dimensions and position of the seated occupant 80 and using a controller with image processing may determine the dimensional distance and angle data and may activate one or more of the actuators to change the ergonomic configuration of the seat assembly 20. As such, the ergonomic position of the seated occupant 80 seated in seat assembly 20 may be dynamically adjusted as the vehicle 10 is operated. It should be appreciated that the adjustment of the seat assembly 20 while the vehicle 10 is driven may occur at a very slow rate such that the adjustment is not readily noticeable to the seated occupant 80. It should further be appreciated that the adjustment to the seating assembly 20 may occur when the vehicle 10 is stopped and not in motion.

Referring to FIG. 2B, examples of determinable dimension data and position data of the seated occupant 80 are illustrated. The seated occupant 80 is shown seated on the adjustable seat assembly 20 that may be adjusted in height H with at least one actuator, may be adjusted to slide forward or rearward in length L with at least one other actuator, may be adjusted to incline angles between the seat and seat base as shown by angle $\theta_R$ and an angle between the headrest 46 and seatback 44 shown as angle $\theta_{HR}$. In addition, the seated occupant has dimensions of the feet 92, leg 88 including the lower leg and upper leg, torso 86, arm 84 including a lower arm and upper arm, and head position. In addition, the angles between the feet and the lower leg referred to as angle $\alpha_{FL}$ may be measured. The angle $\alpha_L$ which is the angle between the lower leg and upper leg may be measured. The angle $\alpha_{AL}$ which is the angle between the abs or back and upper leg of the user may be measured. The angle between the lower arm and upper arm referred to as $\alpha_A$ may be measured. The angle of the head relative to the neck CHN may be measured. It should be appreciated that various dimensions of the body parts and angles of the body parts relative to each other may be measured using image recognition and distance data and the controller may determine an ergonomically adjusted position of the user on the seat. This is achieved by adjusting with one or more actuators the position of the seat to change the ergonomic positioning of the seated occupant.

Figure 3:
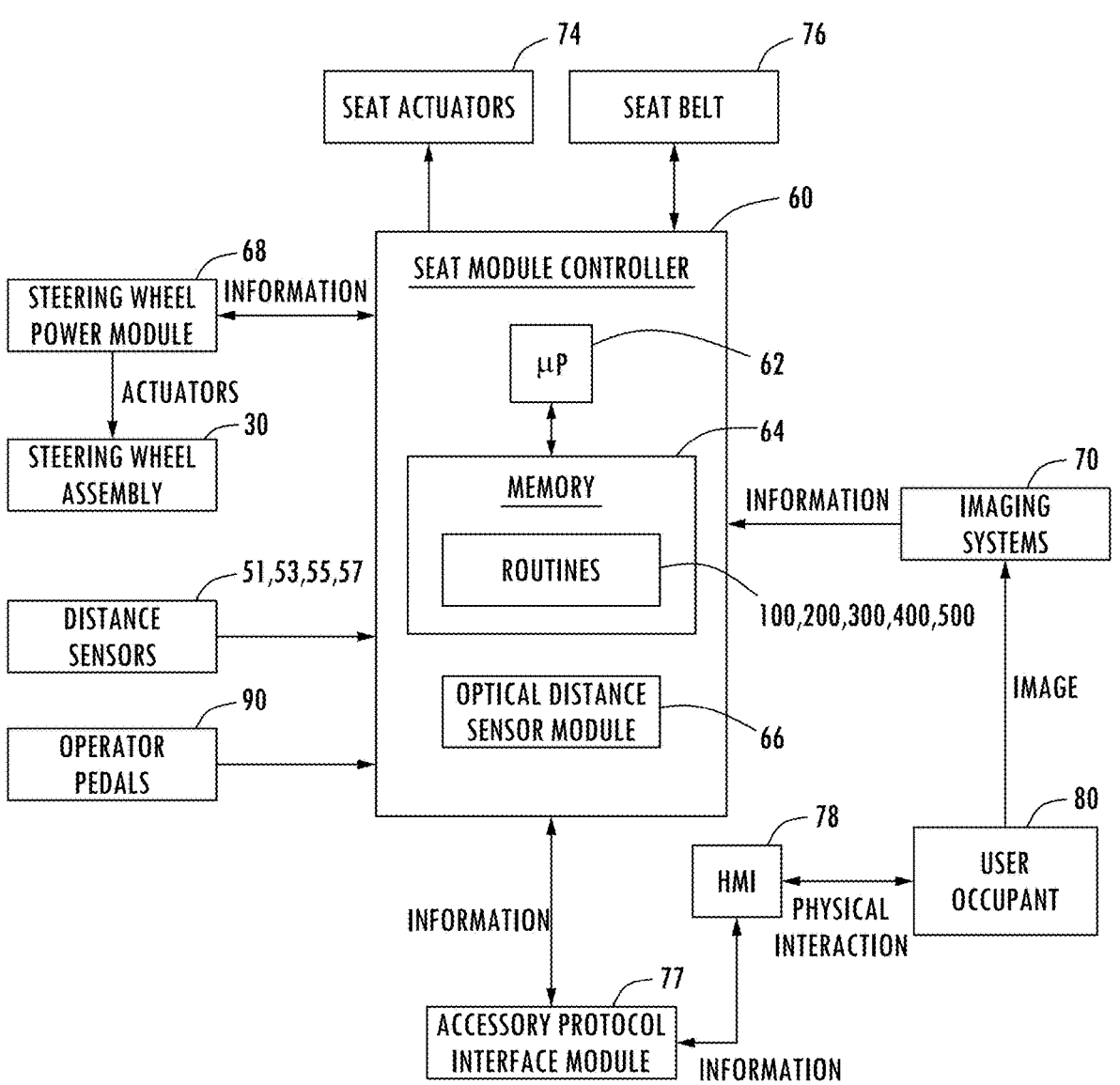
FIG. 3 is a block diagram of a control system for controlling the adjustable seat assembly and other controls, according to one embodiment.

Referring to FIG. 3, the seat assembly 20 is further illustrated having a seat module controller 60 for receiving various inputs and providing control outputs. The seat module controller 60 may include a microprocessor 62 or other analog and/or digital control circuitry. In addition, the seat module controller 60 includes memory 64 which may store various routines, such as routines 100, 200, 300, 400 and 500. In addition, an optical distance sensor module 66 may be incorporated into the seat module controller 60 or may be separate therefrom. The optical distance sensor module 66 may receive sensed output signals from distance sensors 51, 53, 55 and 57, such as time-of-flight sensors such as radar, ultrasonic, laser and other time-of-flight sensors.

The seat module controller 60 receives first and second images from the respective first and second imaging systems 70 and processes the first and second images using image processing. The image processing may include processing one or more routines with image recognition algorithms that may determine the various body parts of the seated occupant 80 and, with the use of the acquired images and distance measurement from distance sensors may determine dimensional data and angles that define the orientation of the body parts of the seated occupant. The seat module controller 60 may determine the distance and angle configuration of the seated occupant and may process the various routines 100, 200, 300, 400 and 500 to provide adjustments to one or more actuators to adjust the seat assembly 20 as well as other assemblies including the steering wheel assembly 30, the seatbelt assembly 76, as well as adjustable mirror assemblies and the operator pedals 90 such as the brake and accelerator pedals on the vehicle 10.

The seated occupant 80 may communicate via an HMI 78 to input user controls such as to manually adjust the seat assembly or select programmed settings. The HMI 78 may communicate with the seat module controller 60 via an accessory protocol interface module 77.

Figure 4A:
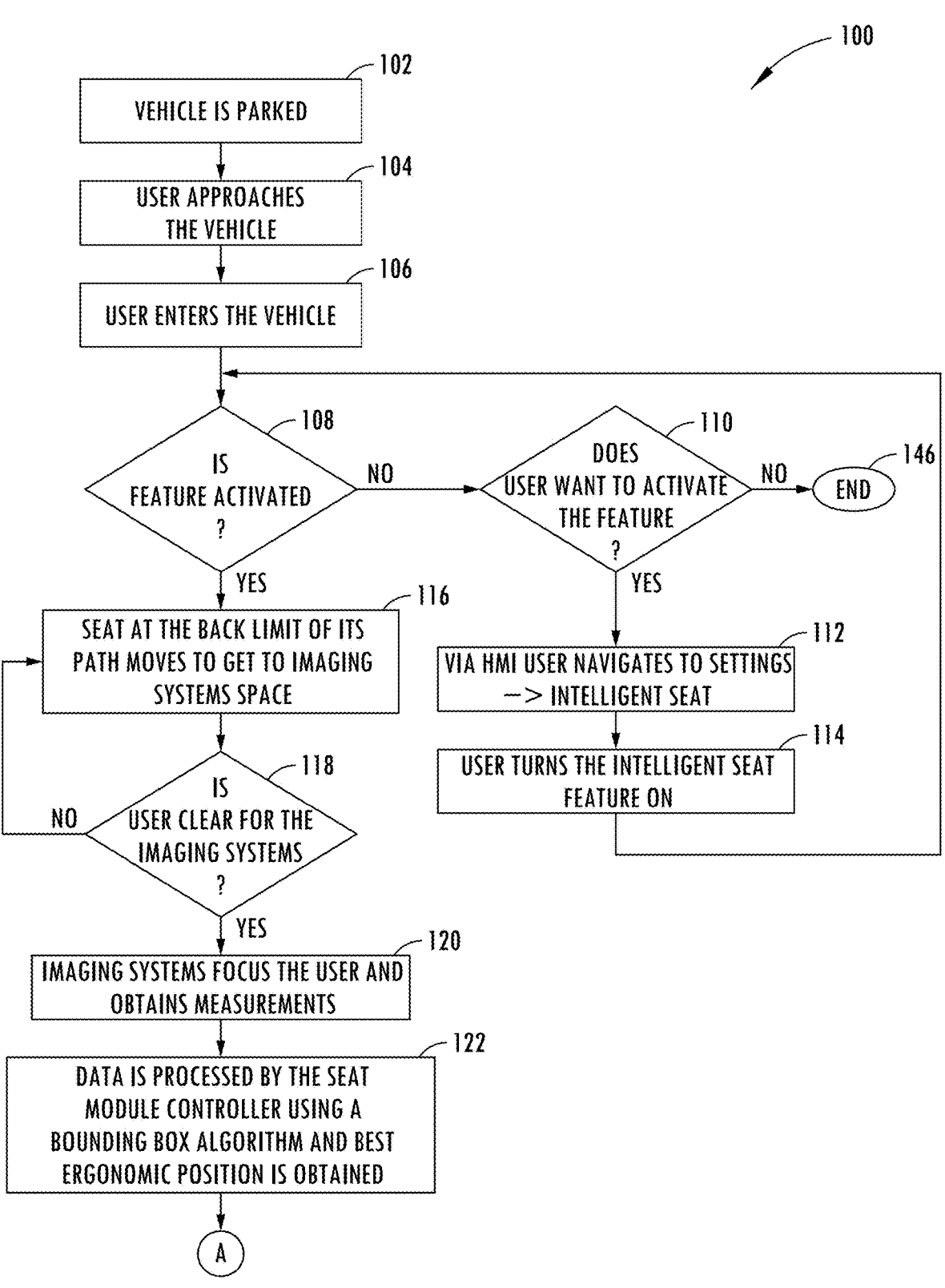
FIGS. 4A and 4B are a flowchart for controlling the adjustable seat assembly, according to one example.
Figure 4B:
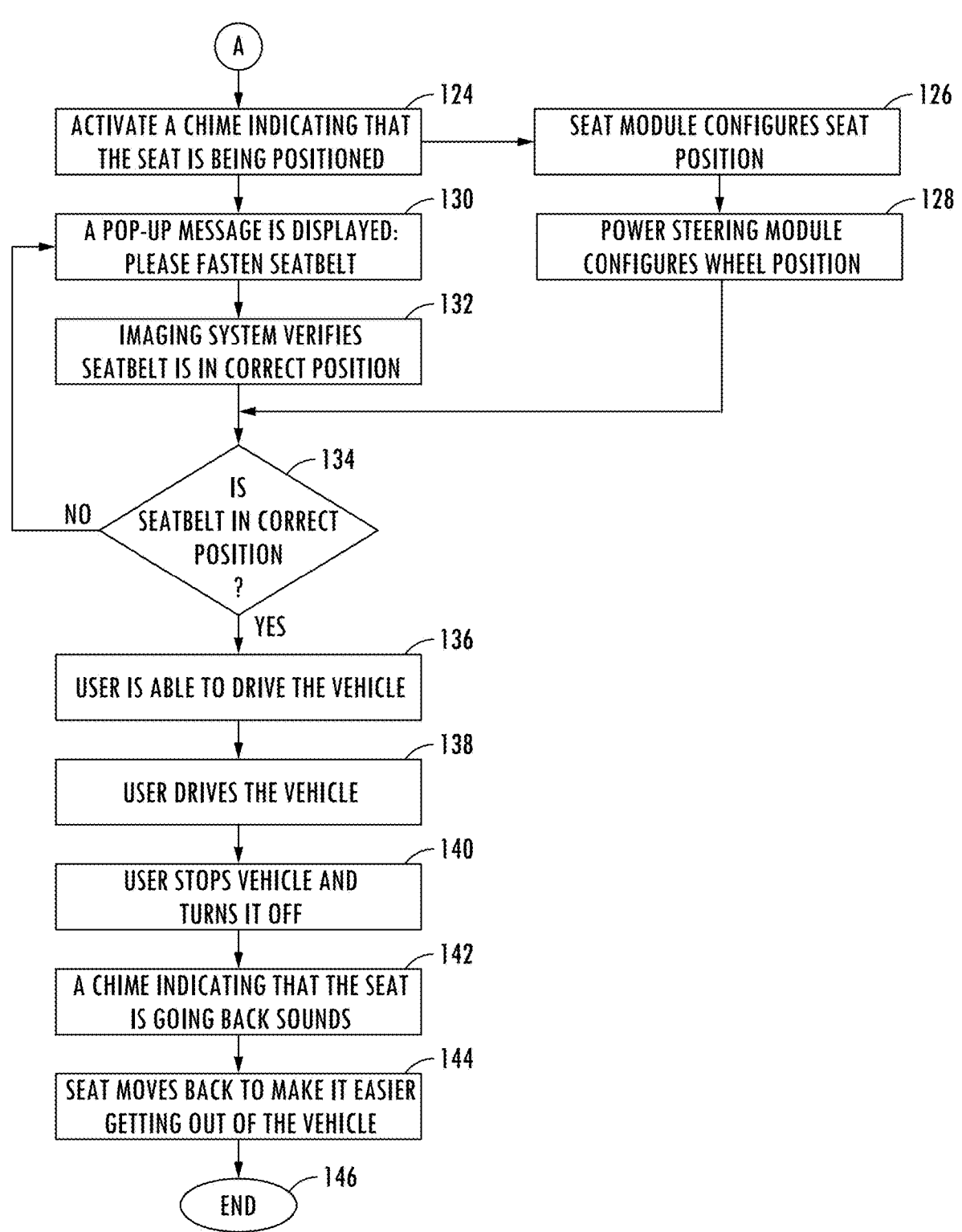

Referring to FIGS. 4A and 4B, a method or routine 100 of sensing parameters of a seated occupant and adjusting the seating assembly is illustrated, according to one example. Routine 100 begins at step 102 when the vehicle is parked. Next, at step 104, a user (occupant) approaches the vehicle and enters the vehicle at step 106. Routine 100 then proceeds to step 108 to determine if the ergonomic adjustment feature is activated. If the ergonomic adjustment feature is not activated, routine 100 proceeds to decision step 110 to determine if the user wants to activate the ergonomic adjustment feature and, if not, ends at step 146. If the user wants to activate the ergonomic adjustment feature, routine 100 proceeds to step 112 to allow a user to navigate the settings to the intelligent seat setting using the human-machine interface (HMI), and then to step 114 where the user turns the ergonomic adjustment feature on before returning to decision step 108. If the ergonomic adjustment feature is activated, routine 100 proceeds to step 116 so that the seat at the back limit of its path of travel moves to get to the imaging systems' imaging space. Next, at decision step 118, routine 100 determines if a user is clear for the first and second imaging systems and, if not, returns to step 116. If the user is clear for the first and second imaging systems, routine 100 proceeds to step 120 where the first and second imaging systems focus on the user and obtain measurements, and then to step 122 where data is processed by the seat module controller using a bounding box algorithm and the best ergonomic position of the seated occupant is obtained.

Routine 100 then proceeds to step 124 where an audible chime is activated indicating that the seat assembly is being positioned and a pop-up message is displayed to fasten the seatbelt at step 130. Next, at step 132, the imaging system verifies the seatbelt is in the correct position. At the same time, the seat control module configures the seat position to the adjusted ergonomic position in step 126 and the power steering module configures the steering wheel at step 128.

Next, routine 100 proceeds to decision step 134 to determine if the seatbelt is in the correct position and, if not, returns to step 130. If the seatbelt is determined to be in the correct position, method 100 proceeds to step 136 to allow a user to drive the vehicle, and then to step 138 where the user drives the vehicle. Next, the user may stop the vehicle and turn it off at step 140, and at step 142 an audible chime is activated indicating that the seat assembly is going to move back. The vehicle seat assembly may then move back to make it easier getting out of the vehicle at step 144, before ending at step 146.

Referring to FIG. 5, a method or routine 200 is illustrated for selecting the ergonomic adjustment feature. Routine 200 begins with the ergonomic adjustment feature activated at step 202. Proceeding to step 204, routine 200 determines if a user tries to manually adjust the seat assembly. Then at step 206, a pop-up message appears in the HMI indicating that the user is about to modify the seat position, and this disables the ergonomic adjustment feature. Next, at decision step 208, method 200 determines if a user selects a decision to proceed and, if not, returns to step 206. If the user selects proceed, routine 200 proceeds to step 210 where the ergonomic adjustment feature is deactivated and control goes back to manual operation before ending at step 212.

Figure 6:
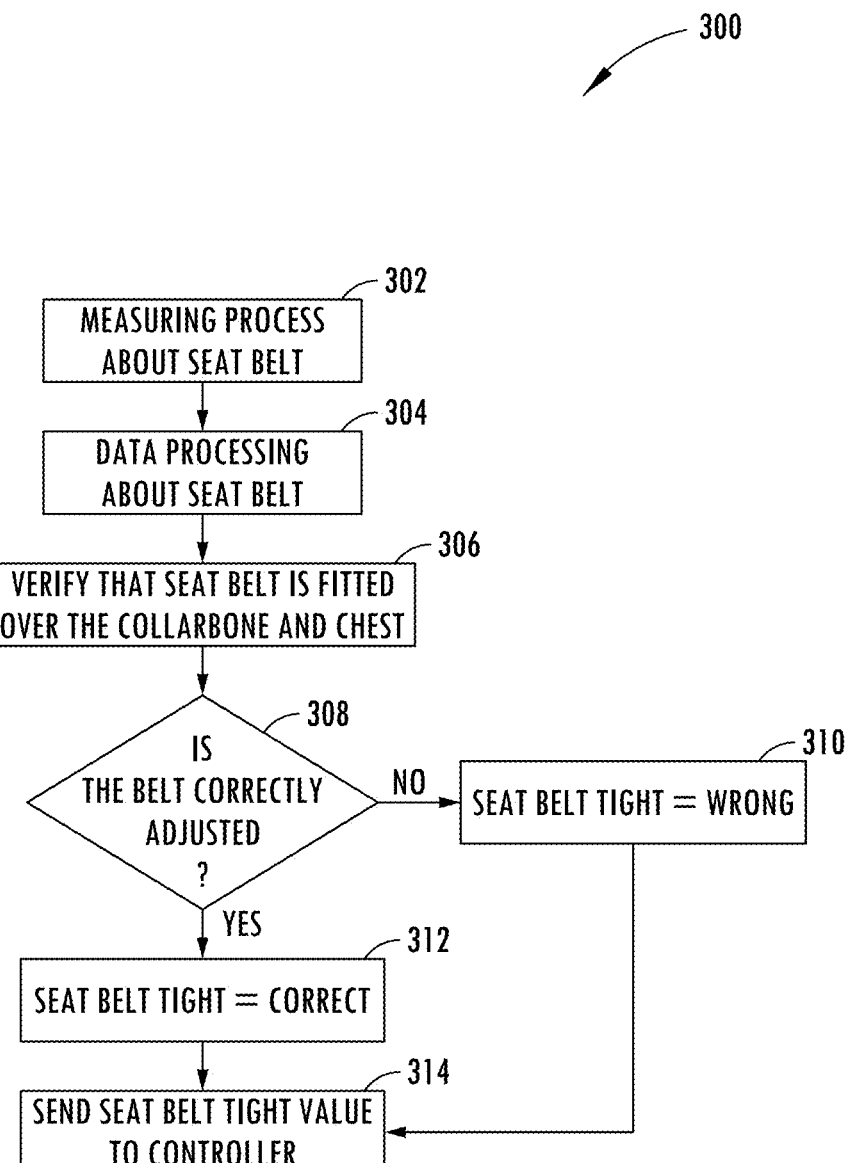
FIG. 6 is a flow diagram illustrating a method for adjusting the seat assembly seatbelt tension, according to one example.

Referring to FIG. 6, a method or routine 300 is illustrated for controlling the seatbelt, according to one example. Routine 300 begins at step 302 where the process about the seatbelt is measured and proceeds to step 304 where data processing about the seatbelt is activated. Next, routine 300 verifies that the seatbelt is fitted over the collarbone and chest of the seat occupant at step 306 and proceeds to decision step 308 to determine if the seatbelt is correctly adjusted. If the seatbelt is not correctly adjusted, routine 300 proceeds to step 310 to indicate that the seatbelt fit is wrong. Otherwise, if the seatbelt is correctly adjusted, routine 300 proceeds to step 312 to set the seatbelt tight to the correct setting, and then step 314 to send the seatbelt tight value to the controller.

Figure 7:
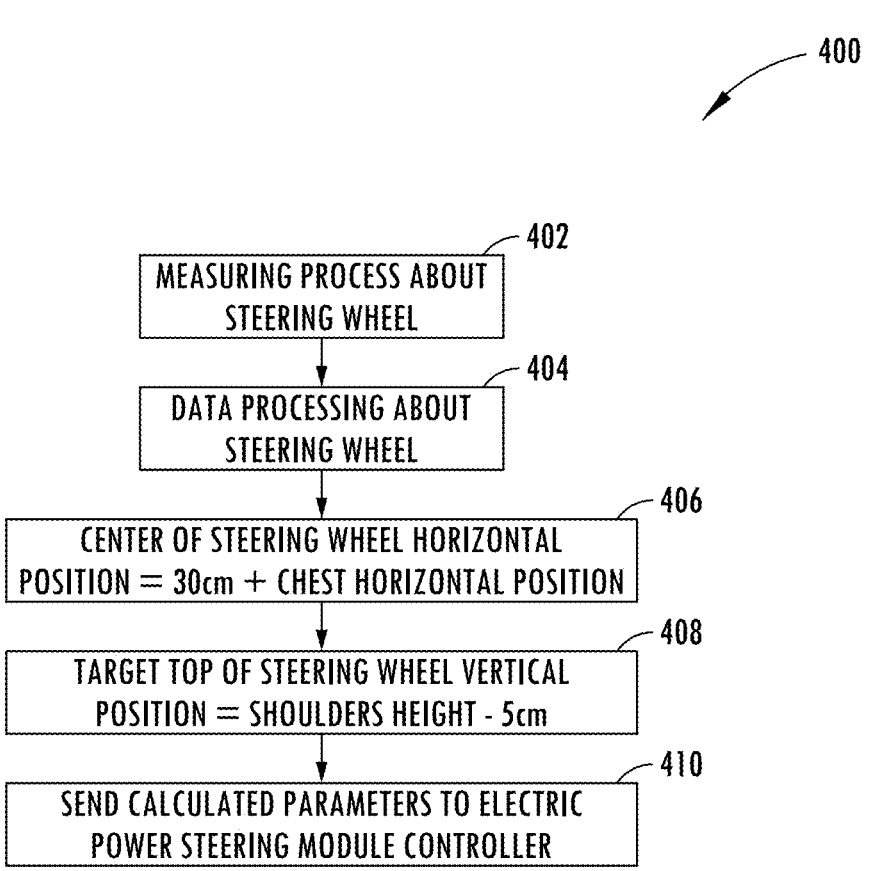
FIG. 7 is a flowchart illustrating a method for adjusting the vehicle steering wheel assembly, according to one example.

Referring to FIG. 7, a method or routine 400 is illustrated beginning at step 402 by measuring the process about the steering wheel and proceeding to step 404 where data processing about the steering wheel is implemented. Next, at step 406, routine 400 determines the center of the steering wheel horizontal position with respect to a distance, such as a predetermined distance of 30 cm. Next, at step 408, routine 400 sets the target top of the steering wheel vertical position equal to approximately shoulder's height minus a distance of 5 cm, for example. Finally, at step 410, routine 400 sends the calculated parameters to the electric power steering module controller.

Figure 8:
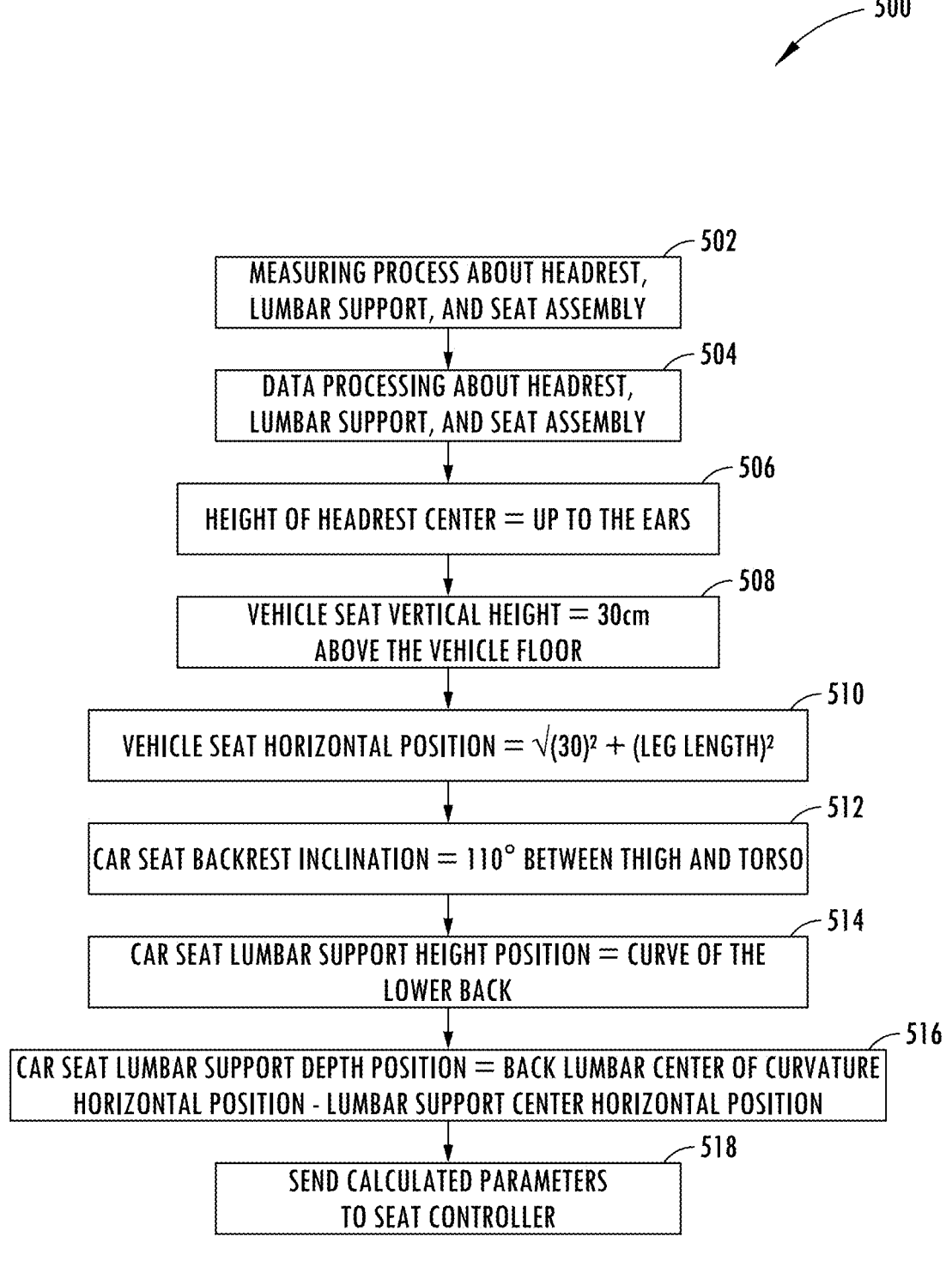
FIG. 8 is a flowchart illustrating a method for adjusting the ergonomic position of the adjustable seating assembly, according to one example.

Referring to FIG. 8, a method or routine 500 is illustrated beginning at step 502 measuring the process about the headrest, lumbar support and seat assembly. Next, routine 500 determines the data processing about the headrest, lumbar support and seat assembly at step 504. At step 506, routine 500 determines the height of the headrest center which may be set up to approximately the ears of the occupant, for example. Next, routine 500 proceeds to step 508 to set the vehicle seat vertical height equal to a distance, such as 30 cm, above the vehicle floor. Routine 500 then proceeds to step 510 to set the vehicle seat horizontal position according to a predetermined value. Next, method 500 proceeds to step 512 to set the vehicle seat backrest inclination angle such as to 110° between the thigh and torso of the occupant. Next, routine 500 proceeds to step 514 to set the car seat lumbar support height position equal to approximately the curve of the lower back of the occupant, for example. Next, routine 500 proceeds to step 516 to set the vehicle seat lumbar support depth position equal to the back lumbar center of curvature horizontal position relative to the lumbar support center horizontal position. Finally, routine 500 sends the calculated parameters to the seat controller at step 518. As such, the seat assembly may therefore be adjusted as determined.

Accordingly, the vehicle 10 advantageously provides for an ergonomically adjustable seat assembly 20 that employs first and second imaging systems to monitor upper and lower portions of a seated occupant and determine dimensions and configurations of the seated occupant and to control one or more actuators to adjust the seat assembly to a determined ergonomic configuration. While the adjustable seat assembly 20 is shown and described herein as the driver seat assembly, it should be appreciated that the ergonomically adjustable seat assembly may be a non-driver passenger seat assembly.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a body defining a cabin interior;
a seat assembly having a seat base, a seat back, and a plurality of actuators configured to adjust ergonomic positions of the seat assembly;
a first imaging system located in the cabin interior and configured to capture first images of an upper body of an occupant seated on the seat assembly, wherein the first imaging system comprises a first upper camera oriented to capture a front view of the upper body and located forward of the seat assembly and a second upper camera oriented to capture a side view of the upper body and located proximate to a roof of the vehicle;
a second imagining system configured to capture second images of a lower body of the occupant seated on the assembly, wherein the second imaging system comprises a first lower camera oriented to capture a front view of the lower body and a second lower camera oriented to capture a side view of the lower body; and
a controller processing the first and second images using a bounding box algorithm to determine dimension data and position data of the occupant and determining an adjusted ergonomic configuration of the seating assembly, the controller further controlling at least one of the plurality of actuators to adjust the seat assembly to the adjusted ergonomic configuration, wherein the adjusted ergonomic configuration comprises a predetermined seat vertical height distance, and wherein the second camera is located, in a lateral vehicle direction from the seat assembly, beyond the second upper camera; and
an adjustable steering wheel assembly having a steering wheel and a plurality of steering wheel actuators configured to adjust ergonomic positions of the steering wheel assembly, and wherein the adjusted ergonomic configuration further comprises a target top of the steering wheel vertical position equal to approximately a shoulder height minus a distance of 5 cm as determined by the processor.

2. The vehicle of claim 1, wherein the first lower camera is located within a steering column of the vehicle.

3. The vehicle of claim 1, wherein the first imaging system captures the first images to include an upper torso and head of the occupant and the second imaging system captures the second images to include legs of the occupant.

4. The vehicle of claim 1, wherein the determined dimension data and position data includes length dimensions of portions of the body of the occupant and angles between interconnected body parts.

5. The vehicle of claim 4, wherein the angles include a back angle and a bent leg angle.

6. The vehicle of claim 1, wherein the plurality of actuators control one or more of a longitudinal position of the seat assembly, a height of the seat assembly, a recline angle of the seat back relative to the seat base, and a lumbar support.

7. The vehicle of claim 4, wherein the angles include a first angle between an upper leg and a lower leg of the occupant, a second angle between the abs and upper legs of the occupant, and a third angle between the seat lumbar support and torso of the occupant.

8. The vehicle of claim 7, wherein the dimension data further includes a distance between a vehicle floor and legs of the occupant.

9. A vehicle comprising:
a body defining a cabin interior;
an adjustable steering wheel assembly having a steering wheel and a plurality of steering wheel actuators configured to adjust ergonomic positions of the steering wheel assembly;
a seat assembly having a seat base, a seat back, and a plurality of seat actuators configured to adjust ergonomic positions of the seat assembly;
a first imaging system located in the cabin interior and configured to capture first images of an upper body of an occupant seated on the seat assembly, wherein the first imaging system comprises a first upper camera oriented to capture a front view of the upper body and a second upper camera oriented to capture a side view of the upper body;

a second imaging system configured to capture second images of a lower body of the occupant seat on the seat assembly, wherein the second imaging system comprises a first lower camera oriented to capture a front view of the lower body and a second lower camera oriented to capture oriented to capture a side view of the lower body; and a controller processing the first and second images using a bounding box algorithm to determine dimension data and position data of the occupant and determining an adjusted ergonomic configuration of the seating assembly and the steering wheel assembly, the controller further controlling the plurality of seat actuators and the steering wheel actuators to adjust the seat assembly and steering wheel assembly to the adjusted ergonomic configuration, wherein the adjusted ergonomic configuration comprises a predetermined seat vertical height distance and a target top of the steering wheel vertical position equal to approximately a shoulder height minus a distance of 5 cm as determined by the processor.

10. The vehicle of claim 9, wherein the first imaging system captures the first images to include an upper torso and head of the occupant and the second imaging system captures the second images to include legs of the occupant.

11. The vehicle of claim 9, wherein the first imaging system is located proximate to a roof of the vehicle and the second imaging system is located forward of the seat assembly.

12. The vehicle of claim 9, wherein the first lower camera is located within a steering column of the vehicle.

13. The vehicle of claim 9, wherein the determined dimension data and position data includes length dimensions of portions of the body of the occupant and angles of between interconnected body parts.

14. The vehicle of claim 9, wherein the plurality of actuators control one or more of a longitudinal position of the seat assembly, a height of the seat assembly, a recline angle of the seat back relative to the seat base, and a lumbar support.

15. The vehicle of claim 11, wherein the second lower camera is located, in a lateral vehicle direction from the seat assembly, beyond the second upper camera.

16. The vehicle of claim 13, wherein the angles include a first angle between an upper leg and a lower leg of an occupant, a second angle between the abs and upper legs of an occupant, and a third angle between the seat lumbar support and torso of the occupant.

* * * * *